United States Patent [19]

Moriya et al.

[11] Patent Number: 5,790,487
[45] Date of Patent: Aug. 4, 1998

[54] OPTICAL INFORMATION RECORDING MEDIUM, OPTICAL INFORMATION RECORDING METHOD, AND OPTICAL INFORMATION REPRODUCING APPARATUS UTILIZING THE SAME

[75] Inventors: Mitsurou Moriya, Ikoma; Osamu Yamaguchi, Hirakata; Yoshihisa Fukushima, Osaka; Namio Hirose, Hirakata, all of Japan

[73] Assignee: Matsushita Electric Industrial Co., Ltd., Osaka, Japan

[21] Appl. No.: 822,767

[22] Filed: Mar. 21, 1997

Related U.S. Application Data

[63] Continuation of Ser. No. 471,572, Jun. 6, 1995, abandoned.

[30] Foreign Application Priority Data

Jun. 7, 1994 [JP] Japan ................................. 6-125086

[51] Int. Cl.⁶ ........................................................ G11B 7/00
[52] U.S. Cl. ........................... 369/48; 369/32; 369/58; 369/59
[58] Field of Search ................................. 369/48, 47, 49, 369/50, 54, 58, 59, 60, 124, 32; 360/32, 48, 49, 60

[56] References Cited

U.S. PATENT DOCUMENTS

| | | | |
|---|---|---|---|
| 4,516,163 | 5/1985 | Masuda et al. | 360/32 |
| 4,788,685 | 11/1988 | Sako et al. | 360/49 X |
| 5,418,852 | 5/1995 | Itami et al. | 360/60 X |

FOREIGN PATENT DOCUMENTS

| | | |
|---|---|---|
| 314 524 | 5/1989 | European Pat. Off. |
| 474 377 | 3/1992 | European Pat. Off. |
| 0 655 739 | 5/1995 | European Pat. Off. |
| 52-93222 | 8/1977 | Japan . |
| 53-13123 | 5/1978 | Japan . |
| 60-74125 | 4/1985 | Japan . |
| 62-20145 | 1/1987 | Japan . |
| 6-195878 | 7/1994 | Japan . |
| 7-161139 | 6/1995 | Japan . |

*Primary Examiner*—Muhammad N. Edun
*Attorney, Agent, or Firm*—Ratner & Prestia

[57] ABSTRACT

An optical information recording medium includes a track storing information in a plurality of sectors, wherein the track is formed spirally or concentrically. One sector includes a plurality of frames and one frame includes a resync mark region, a frame address region, an information region, and a postamble region. In the information region in the first frame, identification information for identifying the position of the sector is stored. In the information region in each frame, information obtained as a result of scrambling performed based on a value of the identification information is stored.

25 Claims, 14 Drawing Sheets

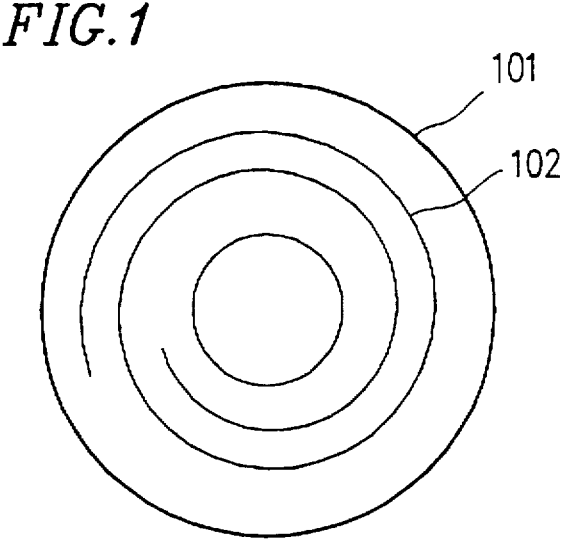

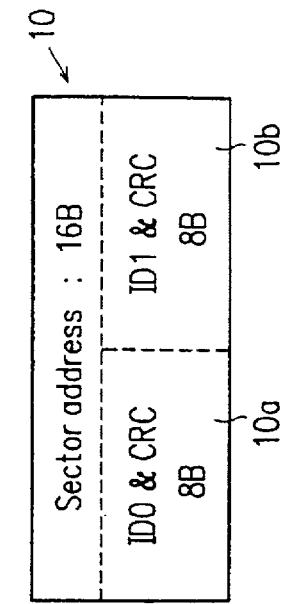
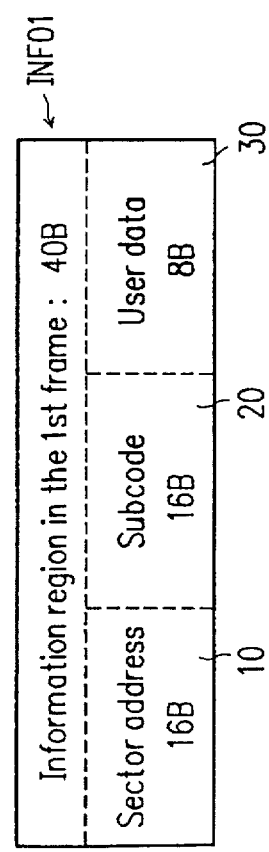
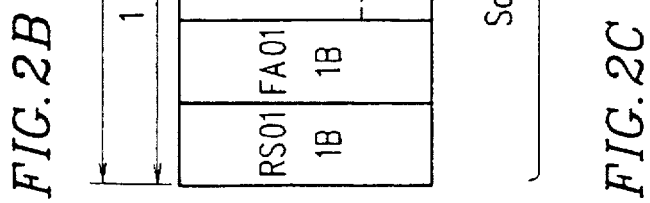

5,790,487

OPTICAL INFORMATION RECORDING MEDIUM, OPTICAL INFORMATION RECORDING METHOD, AND OPTICAL INFORMATION REPRODUCING APPARATUS UTILIZING THE SAME

This application is a continuation of application Ser. No. 08/471,572 filed Jun. 6, 1995, now abandoned.

BACKGROUND OF THE INVENTION

1. Field of the Invention

The present invention relates to an optical information recording medium from which information is read by radiation of a converged light beam, and an optical information recording method for recording information in such an optical information recording medium, and an optical information reproducing apparatus for reading information which is recorded in the optical information recording medium using such an optical information recording method.

2. Description of the Related Art

Optical information recording medium used exclusively for reproducing information data (hereinafter, referred to as optical information carriers), which store a large capacity of data for reproduction, are used more and more today for carrying various types of information data such as audio and video information data. An increase in capacity of information which can be stored by the optical information carrier and a reduction in size of the optical information reproducing apparatus using the optical information carrier are demanded. In order to fulfill such demands, the information recording density in the optical information carrier needs to be raised.

In a conventional optical information carrier, an information track (hereinafter, referred to simply as a "track") having pits is formed spirally or concentrically in a surface of a disc-shaped substrate formed of a resin. On the surface having the track (hereinafter, referred to as a "information carrying surface"), a reflective film formed of aluminum or the like is formed by sputtering or the like. In this specification, the spiral track will be treated as a plurality of tracks for simplicity when describing portions of the spiral track which are at different radial distances from the center of the optical information carrier.

In order to reproduce information from such an optical information carrier, a light beam generated by a semiconductor laser is radiated toward the optical information carrier and converged on the information carrying surface thereof. While performing tracking control, namely, while controlling the light beam to be on the track, the light reflected by the optical information carrier is detected. The intensity of the reflected light changes in accordance with the pits which are formed in correspondence with the information. Thus, the information is read by detecting the change in the intensity of the reflected light.

As methods for detecting a control signal used for tracking control, namely, a tracking error signal indicating a positional error (referred to as a "tracking error") of the light beam on the optical information carrier from the track, a differential phase tracking error detection method or a 3-beam method are known.

By the differential phase tracking error detection method, a light detector located on a detection surface is divided along the tracking direction and the width direction of the track to have four detector elements. The light reflected by the optical information carrier is received by such a light detector, and a tracking error signal is detected based on a phase difference between the added signals from diagonal pairs of the detector elements. The differential phase tracking error detection method is disclosed in, for example, Japanese Laid-Open Patent Publication Nos. 52-93222 and 62-20145.

By the 3-beam method, a light beam for reading information and two auxiliary light beams (total three beams) are radiated toward the optical information carrier, and the light beams reflected by the optical information carrier are detected by a light detector. A tracking error signal is detected based on a difference between the intensities of the light beams obtained from the two auxiliary light beams. The 3-beam method is disclosed in, for example, Japanese Patent Publication No. 53-13123.

The information recording density in the optical information carrier is determined by the track pitch and the information density per unit length of the track (namely, linear density of the information). If the track pitch is reduced, crosstalk caused between two adjacent tracks is increased. Especially in the case when a signal recorded in one track is strongly correlated with a signal recorded in adjacent track, a pseudo tracking error signal is generated, resulting in unstable tracking control. For example, in the case when pits are formed over several tracks at a constant spatial frequency, a signal recorded in the track on which the light beam is positioned is strongly correlated with signals recorded in two tracks adjacent thereto. This causes crosstalk between the three tracks and disturbs the tracking error signal; resulting in unstable tracking control.

For recording of a digital image on the optical information carrier, a still image and a moving image are recorded. For recording a moving image, information to be recorded varies over time and thus no problem is generated. For recording a still image, the same image (the same information) is recorded over several tracks. In such a case, the signals recorded in adjacent tracks are strongly correlated with each other. Thus, the tracking control becomes unstable.

For recording computer data or the like, several outermost tracks or several innermost tracks are used as a control area. The control data recorded in the control area contains information about the table of contents on the optical information carrier. In a blank area of the control area where no information is recorded, data such as "FF" is uniformly recorded in a hexadecimal notation. In such a case also, the same information is recorded over several tracks. As a result, signals which are strongly correlated with each other are recorded in adjacent tracks, thereby causing unstable tracking control.

Tracking control generally occurs in a range of approximately several kilohertz. If signals having a frequency in such a range are strongly correlated with each other, the tracking control is disturbed. For example, when the rotation speed of the optical information carrier is 1,800 rpm, at a position radially away from the center of the optical information carrier by approximately 35 mm, the tracking control is disturbed if tracks have signals which are strongly correlated over several millimeters.

SUMMARY OF THE INVENTION

According to one aspect of the invention, an optical information recording medium includes: a disc-shaped substrate; and at least one track formed in a surface of the substrate in one of a spiral form and a concentric form, wherein the track includes a plurality of sectors arranged successively, and the plurality of sectors each store information obtained as a result of scrambling which is performed based on an initial value obtained in accordance with a value of identification information for identifying a position of the sector.

In one embodiment, the track is formed in the spiral form, and the plurality of sectors included in the track is serially provided with sector numbers for identifying the positions of the sectors, the sector numbers being used as the identification information.

In another embodiment, the initial value changes by a prescribed number of sectors located successively in a circumferential direction of the optical information recording medium.

In still another embodiment, the initial value changes by $2^n$ sectors where n is a positive integer.

In still another embodiment, the initial value changes by a number of sectors which is smaller than a number of sectors included in an innermost track.

According to another aspect of the invention, an optical information recording method for recording information on at least one track formed in a surface of a disc-shaped substrate in one of a spiral form and a concentric form, the track including a plurality of sectors arranged successively, includes the steps of: scrambling the information based on an initial value obtained in accordance with a value of identification information for identifying a position of each of the plurality of sectors; and recording the information obtained as a result of scrambling on the respective sectors.

In one embodiment, the track is formed in the spiral form, the plurality of sectors included in the track is serially provided with sector numbers for identifying the positions of the sectors, and the information is scrambled using a shift register which uses a value corresponding to each of the sector numbers as the initial value.

In another embodiment, the initial value changes by a prescribed number of sectors located successively in a circumferential direction of the optical information recording medium.

In still another embodiment, the initial value changes by $2^n$ sectors where n is a positive integer.

In still another embodiment, the initial value changes by a number of sectors which is smaller than a number of sectors included in an innermost track.

In still another embodiment, the step of scrambling the information includes the steps of: dividing the information into a plurality of units corresponding to the plurality of sectors; scrambling each of the plurality of units of the information based on the initial value obtained in accordance with the value of the identification information; and converting the identification information and the scrambled information into an error-correctable code word, wherein the step of recording the information includes the step of recording the code word in the respective sectors.

In still another embodiment, the step of scrambling the information includes the steps of: dividing the information into a plurality of units corresponding to the plurality of sectors; converting the identification information and each of the plurality of units of the information into an error-correctable code word; and scrambling the code word based on the initial value obtained in accordance with the value of the identification information, wherein the step of recording the information includes the step of recording the scrambled code word in the respective sectors.

According to still another aspect of the invention, an optical information reproducing apparatus for reproducing information recorded on an optical information recording medium including at least one track formed in a surface of a disc-shaped substrate in one of a spiral form and a concentric form, the track including a plurality of sectors arranged successively, and the plurality of sectors each storing information in the state of being scrambled based on an initial value in accordance with a value of identification information for identifying a position of the sector, includes: demodulation means for demodulating a signal reproduced from the optical information recording medium and generating a demodulation signal; identification information reading means for reading the identification information from the demodulation signal; initial value generation means for generating a value corresponding to the identification information read by the identification information reading means; timing signal generation means for generating a timing signal indicating the timing for starting descrambling based on the demodulation signal; descramble signal generation means for generating a signal for descrambling in response to the timing signal, using the value generated by the initial value generation means as the initial value; and descrambling means for descrambling the demodulation signal based on the signal generated by the descramble signal generation means.

According to still another aspect of the invention, an optical information reproducing apparatus for reproducing information recorded on an optical information recording medium including at least one track formed in a surface of a disc-shaped substrate in one of a spiral form and a concentric form, the track including a plurality of sectors arranged successively, and the plurality of sectors each storing information in the state of being scrambled based on an initial value in accordance with a value of identification information for identifying a position of the sector, includes: demodulation means for demodulating a signal reproduced from the optical information recording medium and generating a demodulation signal; error correction means for correcting an error included in the demodulation signal and generating the corrected information; identification information reading means for reading the identification information from the corrected information; initial value generation means for generating a value corresponding to the identification information read by the identification information reading means; timing signal generation means for generating a timing signal indicating the timing for starting descrambling based on the corrected information; descramble signal generation means for generating a signal for descrambling in response to the timing signal, using the value generated by the initial value generation means as the initial value; and descrambling means for descrambling the corrected information based on the signal generated by the descramble signal generation means.

Thus, the invention described herein makes possible the advantages of (1) providing an optical information recording medium and an optical information recording method for providing an accurate tracking error signal while reducing the tracking pitch, and (2) providing an optical information reproducing apparatus for reproducing the information which is recorded in such an optical information recording medium using such an optical information recording method.

These and other advantages of the present invention will become apparent to those skilled in the art upon reading and understanding the following detailed description with reference to the accompanying figures.

BRIEF DESCRIPTION OF THE DRAWINGS

FIG. 1 is a schematic plan view of an optical information carrier;

FIG. 2A is a view illustrating a format of information in one track;

FIG. 2B is a view illustrating a format of information in one sector;

FIG. 2C is a view illustrating a format of an information region of a first frame;

FIG. 2D is a view illustrating a format of one sector address;

DESCRIPTION OF THE PREFERRED EMBODIMENTS

Figure 3:
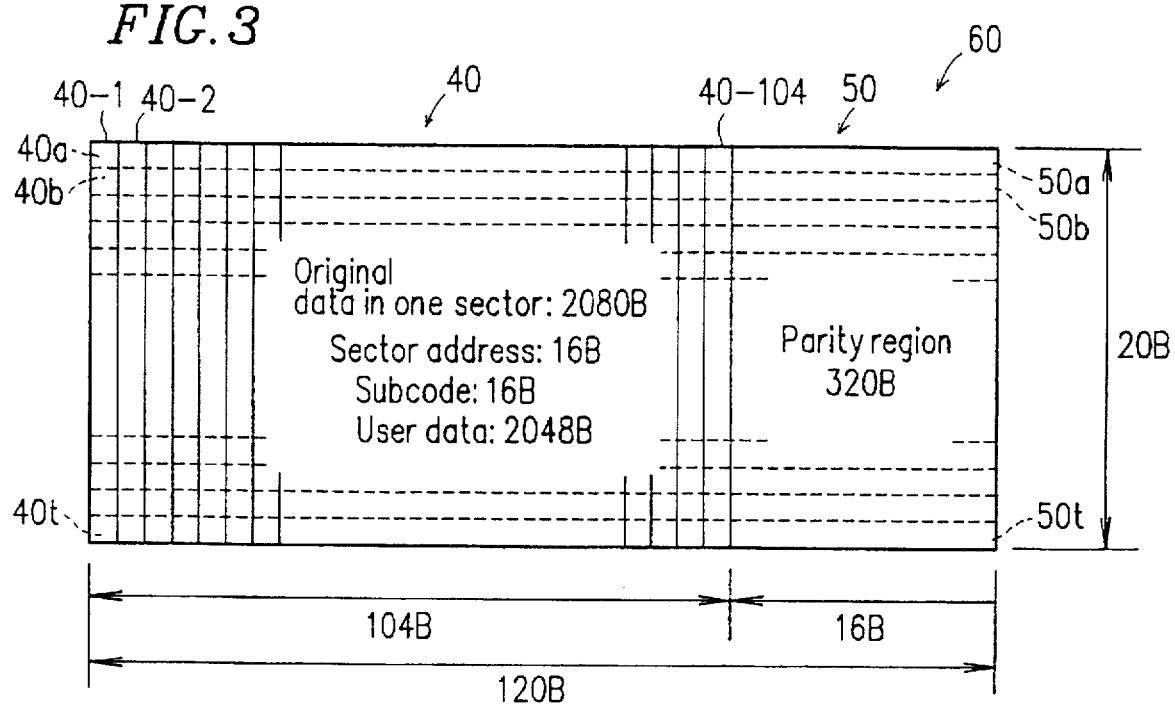
FIG. 3 is a view schematically illustrating a configuration of an arrangement pattern of 2400B information recorded in one sector in the form of an error correction code including a parity region added thereto.

Hereinafter, the present invention will be described by way of illustrative examples with reference to the accompanying drawings.

EXAMPLE 1

A first example according to the present invention will be described with reference to FIGS. 1 through 10.

FIG. 1 is a schematic top view of an optical information carrier 101. In a surface of the disk-shaped optical information carrier 101, a spiral track 102 for storing information in the form of pits is formed. The information is recorded by a CLV (constant linear velocity) system, which allows the information density per unit length of the track 102 (linear density) to be constant regardless of the position in the radius direction of the optical information carrier 101. As is described previously, the spiral track will be treated as a plurality of tracks for simplicity when describing portions of the spiral track which are at different radial distances from the center of the optical information carrier.

With reference to FIGS. 2A through 2D, a format of information recorded in the track 102 will be described in detail.

FIG. 2A shows a format of information stored in the track. In the track 102, a plurality of sectors S1, S2, S3, . . . Sn and Sn+1 which store the information in the same format are formed successively.

FIG. 2B shows a format of one of the plurality of sectors, for example, the first sector S1. The sector S1 includes 60 frames FR01 through FR60. The respective frames FR01 through FR60 include: a resync mark region RS01 through RS60 for realizing frame synchronization when the information is reproduced; a frame address region FA01 through FA60 for identifying the frame position; an information region INF01 through INF60; and a postamble region PA01 through PA60. The resync mark regions RS01 through RS60 and the frame address regions FA01 through FA60 each have a capacity of 1B (byte) when converted to the data in each of the information regions INF01 through INF60. The information regions INF01 through INF60 each have a capacity of 40B.

Typically, one or two pits are formed for each of the postamble regions PA01 through PA60 although more pits can be formed. For example, in the case when recording is performed using the RLL (1,7) modulation system (coding in which an 8-bit data is converted into 12 channel bits), which is known as a run-length limited code, the length of each pit or a length of a space between the respective pits is 2T to 11T where T is a channel clock. However, provision of at least one set of a pit and a space each having a length of 2T is sufficient in each of the postamble regions PA01 through PA60.

Alternatively, formation of the pits in the postamble regions PA01 through PA60 is omitted since the pits therein are used for simply facilitating reading of the information which is stored in the information regions INF01 through INF60.

In the resync mark regions RS01 through RS60, the pits are formed in a pattern which does not appear in the other regions in the frames. For example, in the case of using the RLL (1,7) modulation system, the pits are prescribed to be formed with a space of 12T or more.

FIG. 2C shows a format of one of the information regions, for example, INF01 for the first frame FR01. The information region INF01 having a capacity of 40B includes a sector address region 10 for storing a 16B sector address (header) for identifying the position of the sector, a 16B subcode region 20 for storing management data, and a data region 30 for storing user data having a capacity of 8B.

FIG. 2D shows a format of the sector address region 10. The sector address region 10 includes a first region 10a and a second region 10b which respectively bear address numbers ID0 and ID1 each supplied with an CRC code. That is, the address numbers are recorded twofold, namely, both in the first and the second regions 10a and 10b of the sector address 10. In practice, sector numbers which are provided to the sectors serially from the innermost track to the outermost track are used as the address numbers.

The information stored in the data region 30 (8B) in the information region INF01 in the first frame FR01 and the information stored in the information regions INF02 through INF60 in the frames FR02 through FR60 are scrambled for randomizing the data as is described below in detail. In FIG. 2B, the regions to be scrambled are indicated by reference letters X1 through X60.

FIG. 3 schematically illustrates a configuration of an arrangement pattern of the information having a total capacity of 2400B (40B×60 frames; 40B per frame) stored in one sector as an error correction code (hereinafter, referred as an "ECC") including a parity region added thereto.

The capacity of original data stored in one sector is 2080B (2048B (user data)+16B (sector address) +16B (subcode address)). Herein, the phrase "original data" means the data before conversion into a code word. Such data is treated with interleave with a unit of 1B (1B=8 bits) to be arranged in an original data region 40 in a pattern having 104B as columns and 20B as rows. In detail, the original data is arranged in order in sub regions 40-1 through 40-104 indicated by the solid lines in the original data region 40 in FIG. 3.

A parity region 50 is added to the data in the original data region 40 in the following manner. 104B information digits which form respective other sub regions 40a through 40t indicated by the dashed lines in the original data region 40 in FIG. 3 are respectively provided with 16B check digits. Thus, an ECC is formed to have a code length of 120B, the check digits of 16B and the information digits of 104B. In FIG. 3, the check digits respectively provided to the sub regions 40a through 40t are indicated as sub regions 50a through 50t (dashed lines) in the parity region 50. Thus, the 2048B original data stored in the original data region 40 is provided with the 320B parity region 50, resulting in a total capacity of the information region in each sector of 2400B in a code word region 60. The ECC formed as described above is a type of Reed-Solomon code and is referred to as a long distance code with a degree of redundancy of 16 or simply as an LDC.

Figure 4:
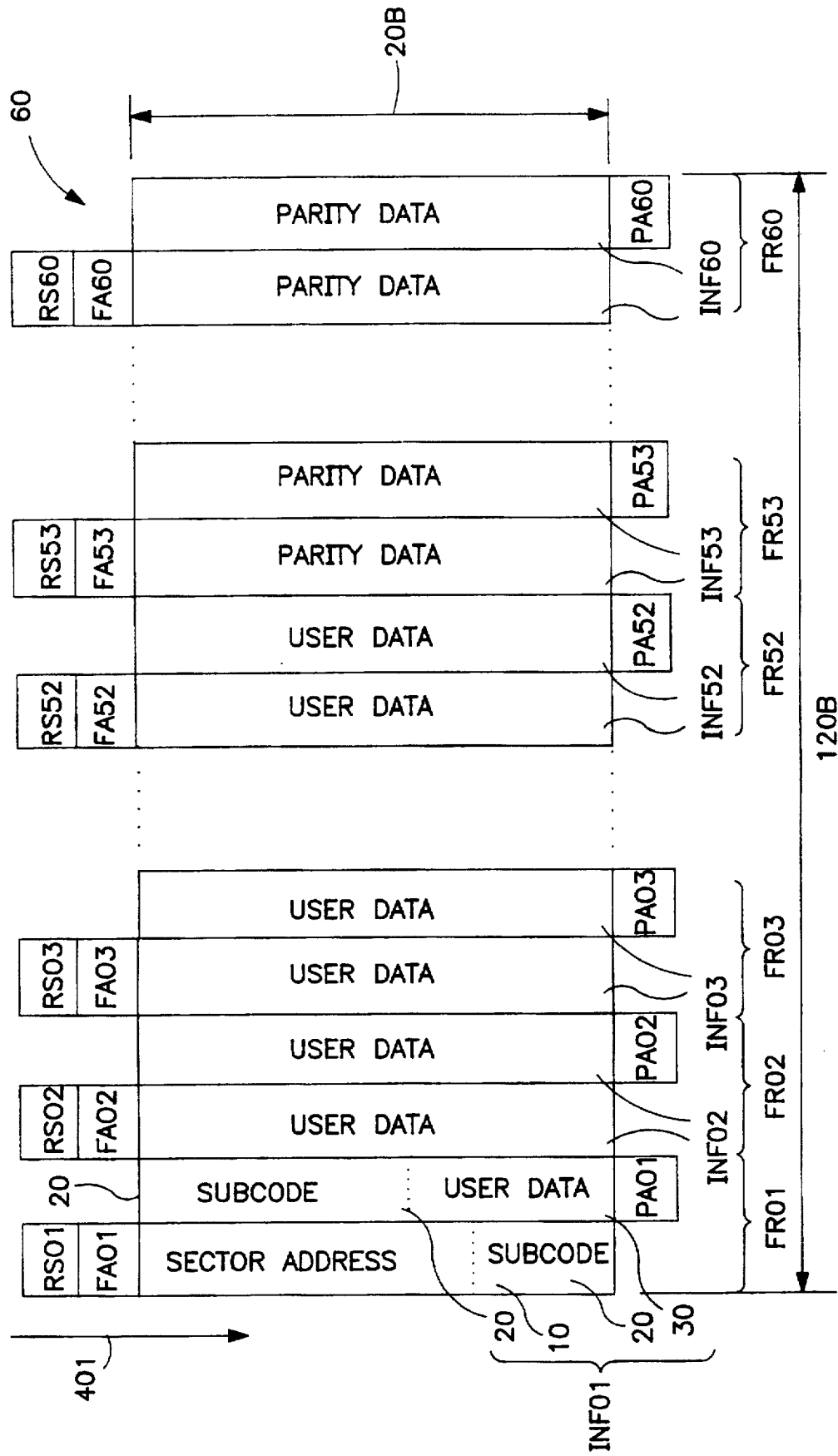
FIG. 4 is a view schematically illustrating a format of the data recorded in the optical information carrier.

With reference to FIG. 4, the order in which information is recorded in one sector will be described. FIG. 4 schematically shows a format of information stored in the optical information carrier 101.

For example, in the first frame FR01, the resync mark region RS01, the frame address region FA01, the information region INF01, and a postamble region PA01 are arranged in this order in the direction indicated by arrow 401. In the information region INF01, the 16B sector address region 10, the 16B subcode region 20, and the 8B user data region 30 are arranged in this order.

Each frame corresponds to two lines. In a first line in the first frame FR01, the resync mark region RS01, the frame address region FA01, and the sector address region 10 and 4B of the subcode region 20 among the information region INF01 are arranged. In a second line in the first frame FR01, the remaining 12B of the subcode region 20, the user data region 30, and the postamble region PA01 are arranged.

The information in the frames FR02 through FR60 are recorded on the optical information carrier 101 in the same manner except that the information regions INF02 through INF60 of the frames FR02 through FR60 do not include the sector address region 10 or the subcode region 20, but only user data is recorded in the information regions INF02 through INF60 entirely.

As is described with reference to FIG. 3, the information to be recorded actually includes the 2080B original data and the 320B check digits in the parity region 50 added to the original data. In the example shown in FIG. 4, the frames FR01 through FR52 correspond to the original data region 40 shown in FIG. 3 and store the original data. The frames FR53 through FR60 correspond to the parity region 60 in FIG. 3.

Figure 5:
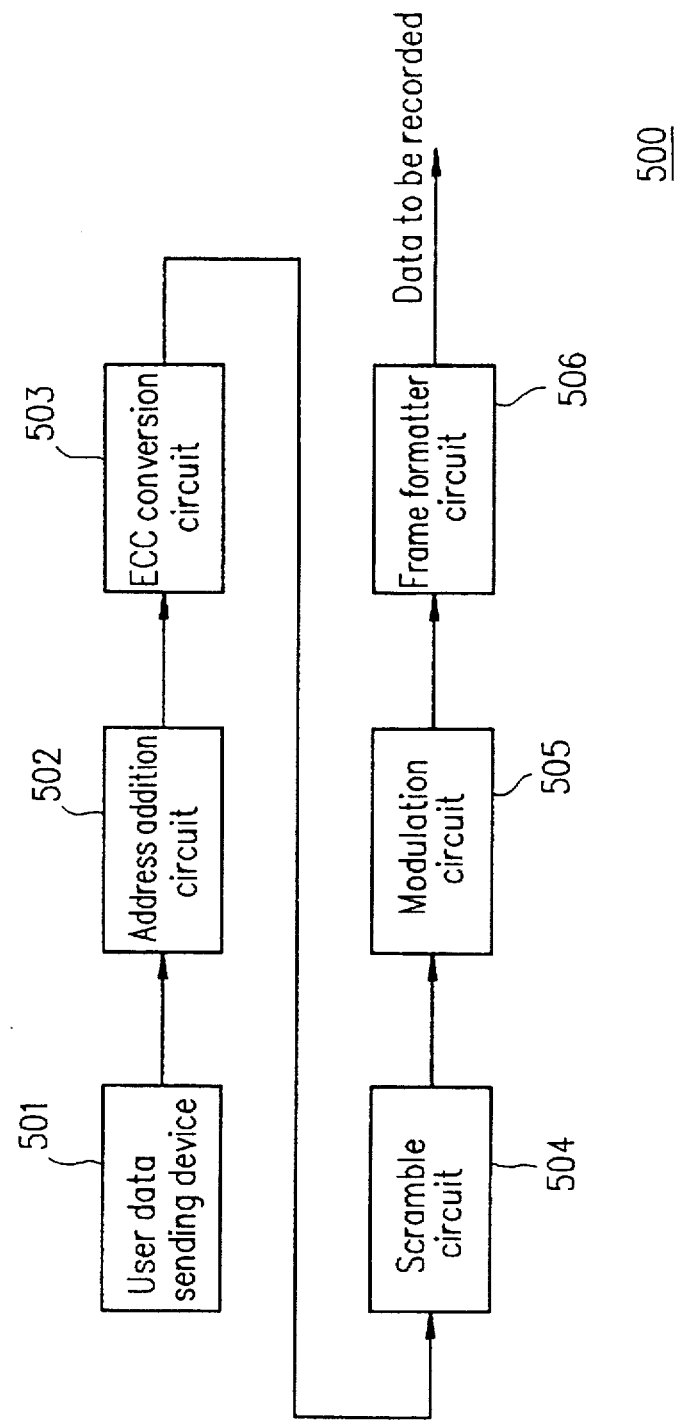
FIG. 5 is a block diagram of a formatter for forming data to be recorded in the optical information carrier in a first example according to the present invention.

With reference to FIG. 5, how the information is recorded will be described. FIG. 5 is a block diagram of a formatter 500 for forming data to be recorded in the optical information carrier 101.

The user data is sent from a user data sending device 501 such as a magnetic disk and the like to an address addition circuit 502. The address addition circuit 502 divides the user data into a plurality of units each of 2048B, adds information of 32B which corresponds to a sector address and a subcode to a leading end of each unit, and sends the resultant data to an ECC conversion circuit 503. The ECC conversion circuit 503 arranges the received data as shown in FIG. 3 to convert into a code word. The converted code word is sent to a scramble circuit 504 in order, starting from the top of the first line (left in FIG. 4). The scramble circuit 504 scrambles the data except for the information of 32B corresponding to the sector address and the subcode to randomize the data, and sends the resultant data to a modulation circuit 505. The modulation circuit 505 modulates the data by a prescribed modulation system and sends the modulated data to a frame formatter circuit 506. The frame formatter circuit 506 divides the received data into a plurality of units each of 40B, and adds a resync pattern and a frame address at a leading end of each unit and also adds a postamble signal at a trailing end of each unit. In this manner, the data to be recorded is formatted completely. The completed data is sent to a recording apparatus (not shown).

In the recording apparatus, a substrate to be formed into the optical information carrier 101 having a photoresist layer is rotated. The rotation speed is set to be in inverse proportion to the distance of the position in the radius direction from the center of the substrate so as to allow the linear velocity to be constant. The intensity of a light beam generated by a light source such as an argon laser or a krypton laser is modulated in accordance with a signal from the frame formatter circuit 506. The modulated light beam is radiated toward the substrate in a rotating state to form pits in a pattern corresponding to the signal. In this manner, the information is recorded. The recording apparatus is known, and thus detailed description thereof is omitted here.

Figure 6:
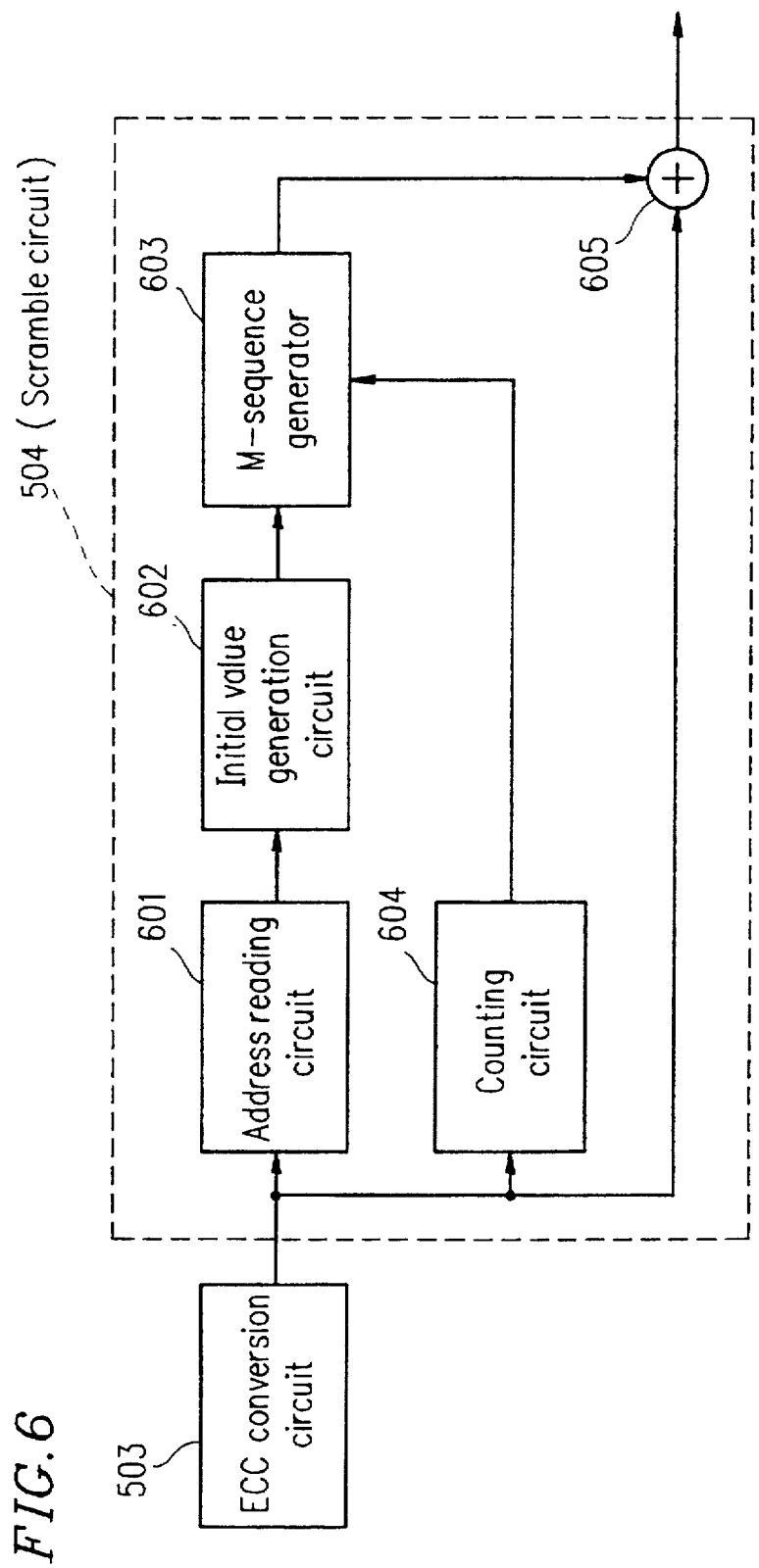
FIG. 6 is a block diagram of a scramble circuit shown in FIG. 5.

With reference to FIG. 6, the scramble circuit 504 will be described. FIG. 6 is a block diagram of the scramble circuit 504.

The scramble circuit 504 includes an address reading circuit 601, an initial value generation circuit 602, an M-sequence generator 603, a counting circuit 604, and an exclusive-OR circuit 605.

The address reading circuit 601 receives the data sent from the ECC conversion circuit 503, reads an sector address number from the data and sends the address number to the initial value generation circuit 602. The address number is used as an identification number for scrambling information. The initial value generation circuit 602 generates an initial value in accordance with the address number and sends the initial value to the M-sequence generator 603. The exclusive-OR circuit 605 successively outputs a signal in accordance with an exclusive-OR operation between a signal from the ECC conversion circuit 503 and a signal from the M-sequence generator 603.

The counting circuit 604 counts the quantity of the data sent from the ECC conversion circuit 503. When a first 32B of the information from the leading end of the sector is completely sent, the counting circuit 604 generates a scramble starting signal and sends the signal to the M-sequence generator 603. The counting circuit 604 acts as a generator of a timing signal which indicates the timing for starting scrambling. The M-sequence generator 603 outputs zero until receiving the scramble starting signal. Accordingly, the data which is sent from the ECC conversion circuit 503 before the counting circuit 604 generates a scramble starting signal is sent out from the exclusive-OR circuit 605 without being scrambled. Once the counting circuit 604 generates a scramble starting signal, the M-sequence generator 603, in response, generates a randomizing signal in correspondence with the initial value which is sent from the initial value generation circuit 602. The randomizing signal is used for scrambling. Accordingly, the exclusive-OR circuit 605 outputs the data from the ECC conversion circuit 503 in the state of being scrambled.

Figure 7:
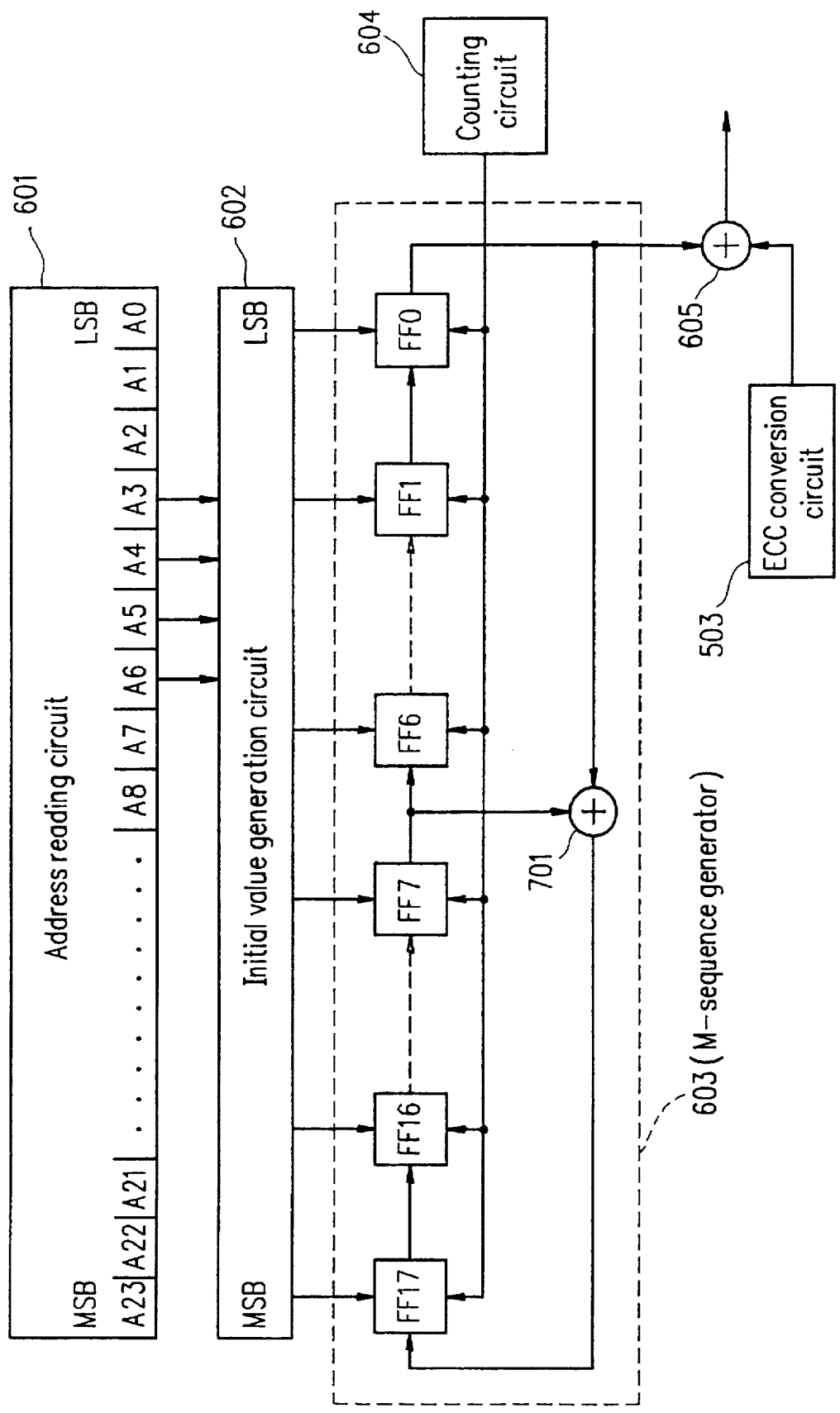
FIG. 7 is a block diagram of an M-sequence generator included in the scramble circuit shown in FIG. 6.

With reference to FIG. 7, the M-sequence generator 603 will be described. FIG. 7 shows a block configuration of the M-sequence generator 603.

Flip-flop circuits FF0 through FF17 included in the M-sequence generator 603 form an 18-bit feedback shift register. In other words, an exclusive-OR between outputs from each of the flip-flop circuits FF0 and FF7 is obtained by an exclusive-OR circuit 701, and such an exclusive-OR is input to the flip-flop circuit FF17. The address reading circuit 601 reads each of addresses serially provided as the sector numbers and sends the values of the fourth least significant bit through the seventh least significant bit (A3 through A6) of the address to the initial value generation circuit 602. The initial value generation circuit 602 generates an initial value in accordance with the received values of the four bits (A3 through A6). Since the value of A3 (the fourth least significant bit) changes every eight sectors, the initial value changes every eight sectors. The initial value generation circuit 602 sends such an initial value which changes every eight sectors to the M-sequence generator 603. When the scramble starting signal is sent from the counting circuit 604 to the M-sequence generator 603, the initial value from the initial value generation circuit 602 is set in the flip-flop circuits FF0 through FF17.

The M-sequence generator 603 shown in FIG. 7 is a type of shift register sequence generator and is referred to as a maximum length shift register sequence generator. A sequence generated by the M-sequence generator 603 is referred to as a maximum length shift register sequence or an M-sequence. The M-sequence generator 603 shown in FIG. 7 generates an 18-order polynomial expressed by the following equation.

$$H(X)=X^{18}+X^{7}+1$$

Since the M-sequence generator 603 in FIG. 7 has an 18-stage shift register, the cycle of a signal sent from the M-sequence generator 603 is $n=2^{18}-1$, namely, approximately 32768B. By appropriately selecting the initial value, data having a capacity of up to 32768B can be randomized completely.

Setting of the initial value will be described, hereinafter.

It is assumed that the optical information carrier 101 has a diameter of 120 mm, and an area between a circle having a radius of 25 mm and a circle having a radius of 58 mm is an information tracking area in which tracks are formed. In the case where the linear density of the information to be recorded in the track is 0.3 μm/bit and the total capacity of information per one sector, including the resync pattern, the frame address and the postamble, is 2530B, the length of one sector is approximately 6.1 mm. This length means that approximately 26 sectors are formed per track in an inner portion of the optical information carrier 101, and that approximately 60 sectors are formed per track in the outer portion thereof. As is described above with reference to FIG. 7, the initial value generation circuit 602 changes the initial value in accordance with the values of the fourth least significant bit to the seventh least significant bit (A3 through A6). Accordingly, the initial value sent to the M-sequence generator 603 changes every time the value of the fourth least significant bit changes, namely, every eight sectors.

For example, in the case where the value obtained by dividing the cycle of a signal from the M-sequence generator 603 by 16 corresponds to the values of A3 through A6 (fourth least significant bit to the seventh least significant bit) of the address which is read by the address reading circuit 601, and the M-sequence generator 603 is preset in accordance with the address, the data is randomized over 128 sectors (=16×8) even if the same data is recorded. The number of sectors per track of the optical information carrier 101 is approximately 60 sectors at the maximum (in an outer periphery). Accordingly, when the data is randomized over 128 sectors, the correlation between signals recorded in adjacent tracks is significantly alleviated.

As is described above, the data in the sector address regions and the subcode regions is not scrambled. The data in the resync mark regions and the postamble regions, which is added after scrambling, is not scrambled either. If such regions are located in adjacent tracks in the width direction of the optical information carrier 101, the correlation is increased. However, even the sector address region and the subcode region having a largest capacity of information have a total capacity of 32B, and the total length thereof is 100 μm or less. Such a length is sufficiently short enough to be ignored.

The reason why the data in the sector address regions is not scrambled is that the initial value needs to be found for obtaining the original information from the scrambled information, namely, when the scrambled information is descrambled for reproducing the recorded information. The data recorded in the subcode regions is information which indicates whether the recorded information is audio information or video information or the like, and thus is preferably read in a short period of time without being descrambled. However, the data in the subcode regions can be scrambled. In such a case, no problem occurs except that reading of the data in the subcode regions requires a certain length of time.

Figure 8:
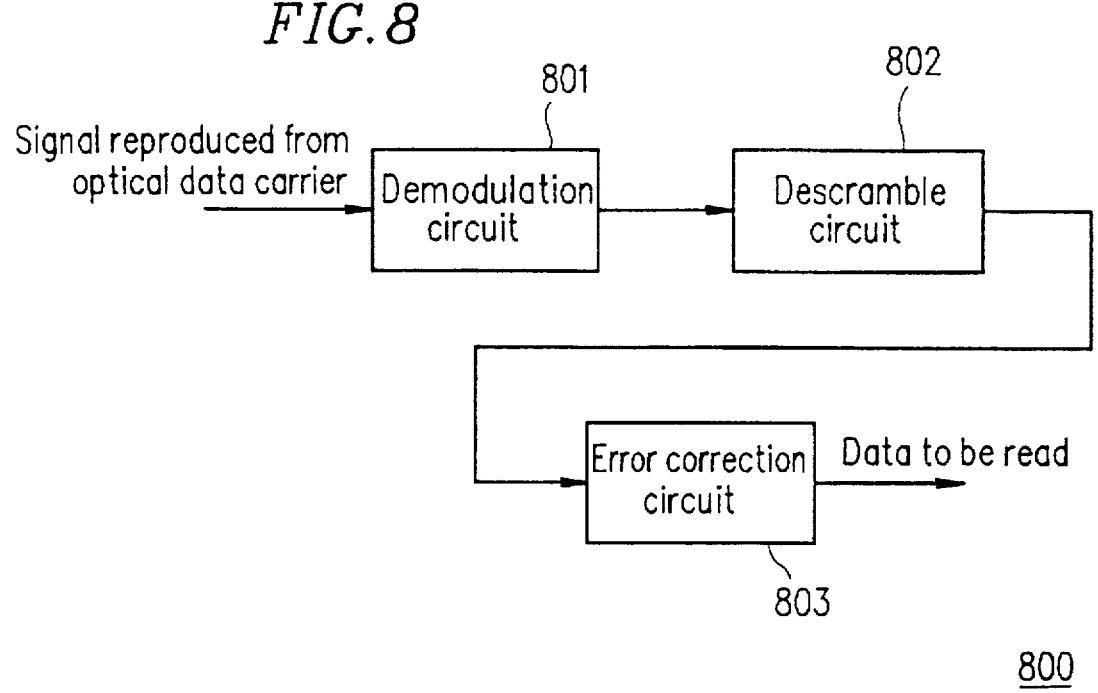
FIG. 8 is a block diagram of an optical information reproducing apparatus for reproducing the data recorded in the optical information carrier in the first example according to the present invention.

With reference to FIG. 8, how the information stored in the optical information carrier 101 is reproduced will be described.

FIG. 8 is a partial block diagram of an optical information reproducing apparatus 800 in the first example according to the present invention. The optical information reproducing apparatus 800 includes a demodulation circuit 801, a descramble circuit 802 and an error correction circuit 803.

The demodulation circuit 801 demodulates the signals reproduced from the optical information carrier using an optical head, and sends the demodulated data to the descramble circuit 802. The descramble circuit 802 reads an address from the demodulated signal and descrambles the data except for the 32B data stored in the sector address region and the subcode region. The resultant data is sent to the error correction circuit 803. The error correction circuit 803 corrects any existing error in the information which is sent from the descramble circuit 802 and sends out the resultant corrected data to be read.

Figure 9:
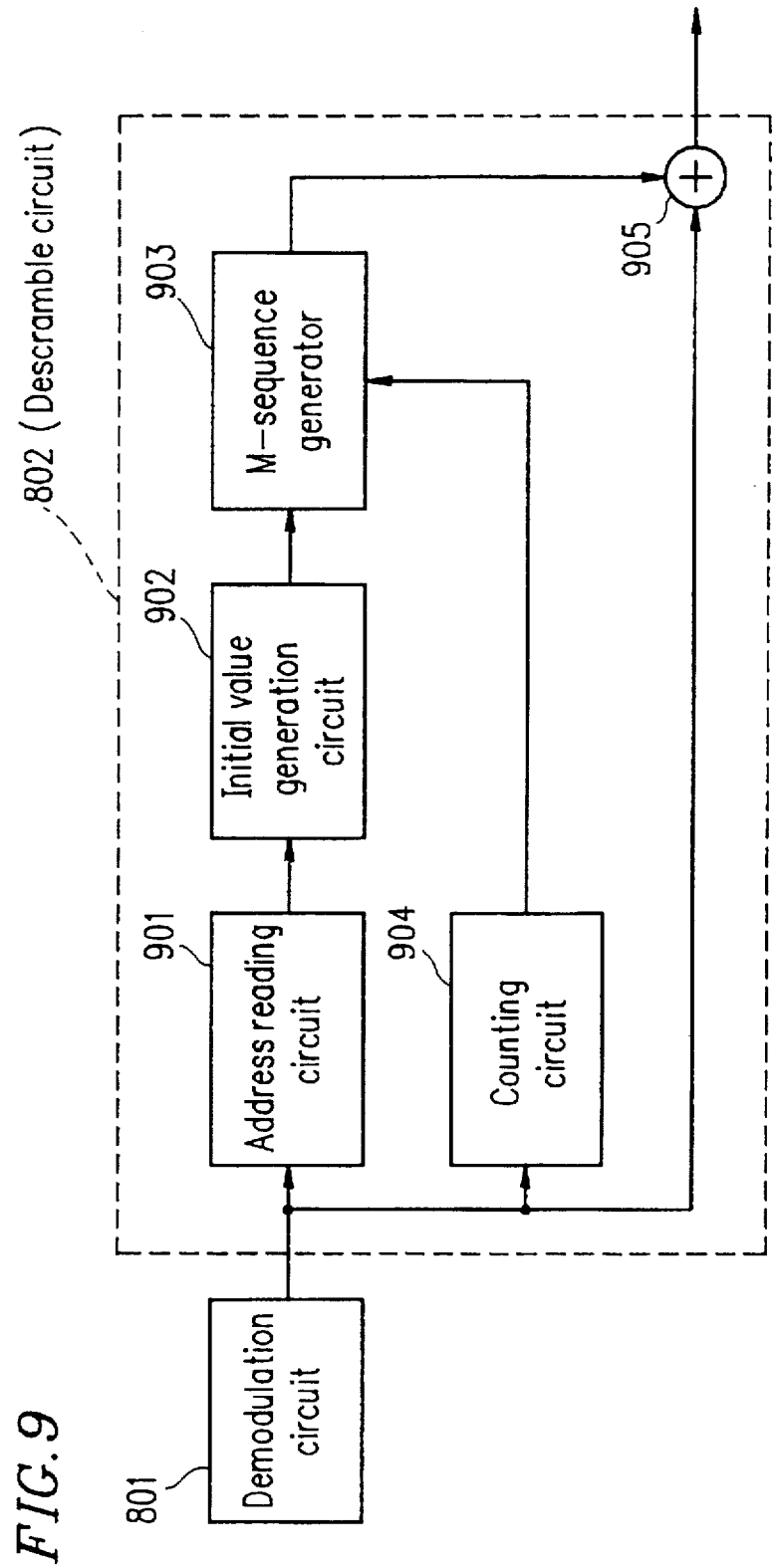
FIG. 9 is a block diagram of a descramble circuit shown in FIG. 8.

With reference to FIG. 9, the descramble circuit 802 will be described in detail.

The descramble circuit 802, which has substantially the same structure as that of the scramble circuit 504 shown in FIG. 6, includes an address reading circuit 901, an initial value generation circuit 902, an M-sequence generator 903, a counting circuit 904, and an exclusive-OR circuit 905.

The address reading circuit 901 receives the reproduced signals sent from the demodulation circuit 801, and reads a sector address number therefrom. The address number, which is used as an identification number for descrambling, is sent to the initial value generation circuit 902. The initial value generation circuit 902 generates an initial value in accordance with the address number and sends the initial value to the M-sequence generator 903.

The counting circuit 904 counts the quantity of the data sent from the demodulation circuit 801. When a first 32B of the information from the leading end of the sector is completely sent, the counting circuit 904 generates a descramble starting signal and sends the signal to the M-sequence generator 903. The counting circuit 904 acts as a generator of a timing signal which indicates the timing for starting descrambling. The M-sequence generator 903 outputs zero until receiving the descramble starting signal. Accordingly, the data which is sent from the demodulation circuit 801 before the counting circuit 904 generates a descramble starting signal is sent out from the exclusive-OR circuit 905 without being descrambled. Once the counting circuit 904 generates a descramble starting signal, the M-sequence generator 903, in response, generates a randomizing signal in correspondence with the initial value which is sent from the initial value generation circuit 902. The randomizing signal is used for descrambling. Accordingly, the exclusive-OR circuit 905 outputs the data from the demodulation circuit 801 in the state of being descrambled.

Figure 10:
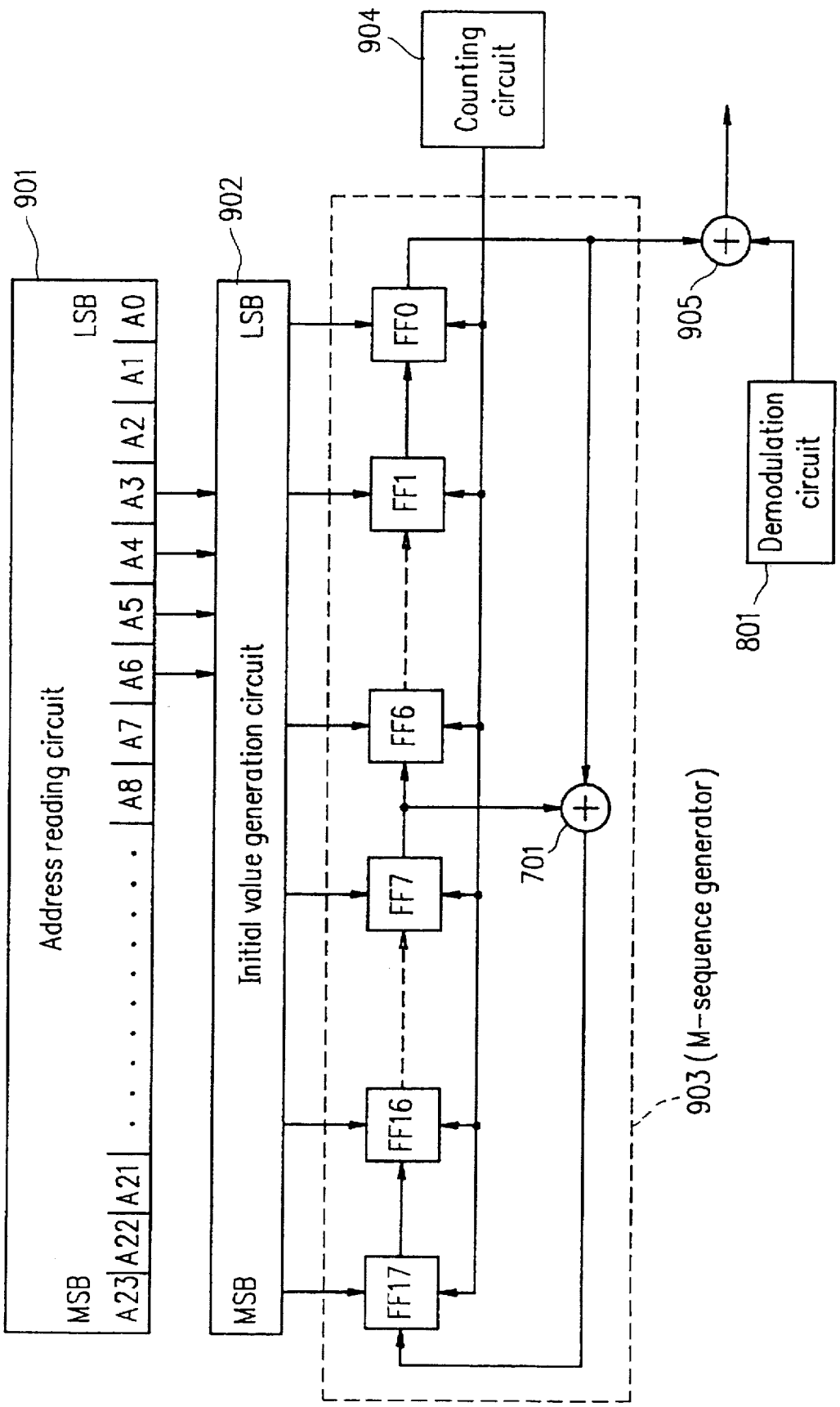
FIG. 10 is a block diagram of an M-sequence generator included in the descramble circuit shown in FIG. 9.

With reference to FIG. 10, the M-sequence generator 903 will be described. FIG. 10 shows a block configuration of the M-sequence generator 903. The M-sequence generator 903 has the same structure as that of the M-sequence generator 603 shown in FIG. 7.

Flip-flop circuits FF0 through FF17 included in the M-sequence generator 903 form an 18-bit feedback shift register. In other words, an exclusive-OR between outputs from each of the flip-flop circuits FF0 and FF7 is obtained by an exclusive-OR circuit 701, and such an exclusive-OR is input to the flip-flop circuit FF17. The address reading circuit 901 reads each of addresses provided serially as the sector numbers to the sectors and sends the values of the fourth least significant bit through the seventh least significant bit (A3 through A6) of the address to the initial value generation circuit 902. The initial value generation circuit 902 generates an initial value in accordance with the values of the four bits (A3 through A6). Since the value of A3 (the fourth least significant bit) changes every eight sectors, the initial value changes every eight sectors. The initial value generation circuit 902 sends such an initial value to the M-sequence generator 903. When the descramble starting signal is sent from the counting circuit 904 to the M-sequence generator 903, the initial value from the initial value generation circuit 902 is set in the flip-flop circuits FF0 through FF17.

EXAMPLE 2

A second example according to the present invention will be described with reference to FIGS. 11 through 14.

In the scrambling operation in the first example, an address is read by performing demodulation when the information is read from the optical information carrier 101. Thus, high-speed retrieval is possible. However, when the address cannot be read, the initial value cannot be found. In such a case, the original data cannot be obtained by descrambling. In such circumstances, high reliability is demanded in reading the address. However, it is not always possible to read all the addresses from the optical information carrier 101 due to dropout, dust and the like in practice.

In the second example, a scrambling system for realizing accurate reading of an address in order to perform descrambling with certainty even in the presence of dropout, dust or the like will be used.

Figure 11:
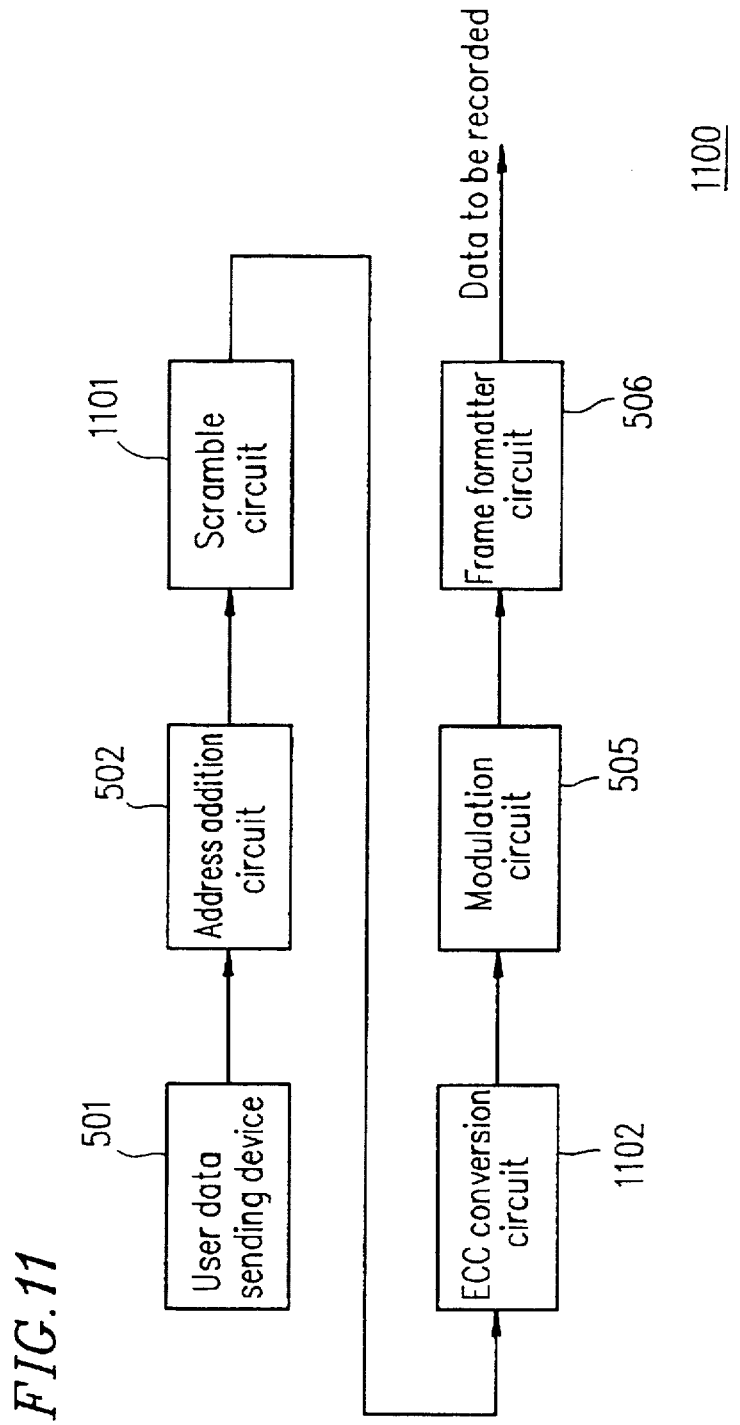
FIG. 11 is a block diagram of a formatter for forming data to be recorded in the optical information carrier in a second example according to the present invention.

FIG. 11 is a block diagram of a formatter 1100 for forming data to be recorded in the optical information carrier 101. In FIG. 11, the same elements as those in FIG. 5 bear the same reference numerals, and detailed explanation thereof will be omitted.

The user data is sent from a user data sending device 501 such as a magnetic disk and the like to an address addition circuit 502. The address addition circuit 502 divides the user data into a plurality of units each of 2048B, adds 32B information corresponding to a sector address and a subcode to a leading end of each unit, and sends the resultant data to a scramble circuit 1101. The scramble circuit 1101 scrambles the data except for the 32B corresponding to the sector address and the subcode to randomize the data, and sends the resultant data to an ECC conversion circuit 1102. The ECC conversion circuit 1102 arranges the received data as is shown in FIG. 3 to convert into a code word. The converted code word is sent to the modulation circuit 505 in order, starting from top of the first line (left in FIG. 4). The modulation circuit 505 modulates the data by a prescribed modulation system and sends the modulated data to a frame formatter circuit 506. The frame formatter circuit 506 divides the data into a plurality of units each of 40B, and adds a resync pattern and a frame address at a leading end of each unit and also adds a postamble signal at a trailing end of each unit. In this manner, the data is formatted completely. The completed data is sent to a recording apparatus (not shown).

Figure 12:
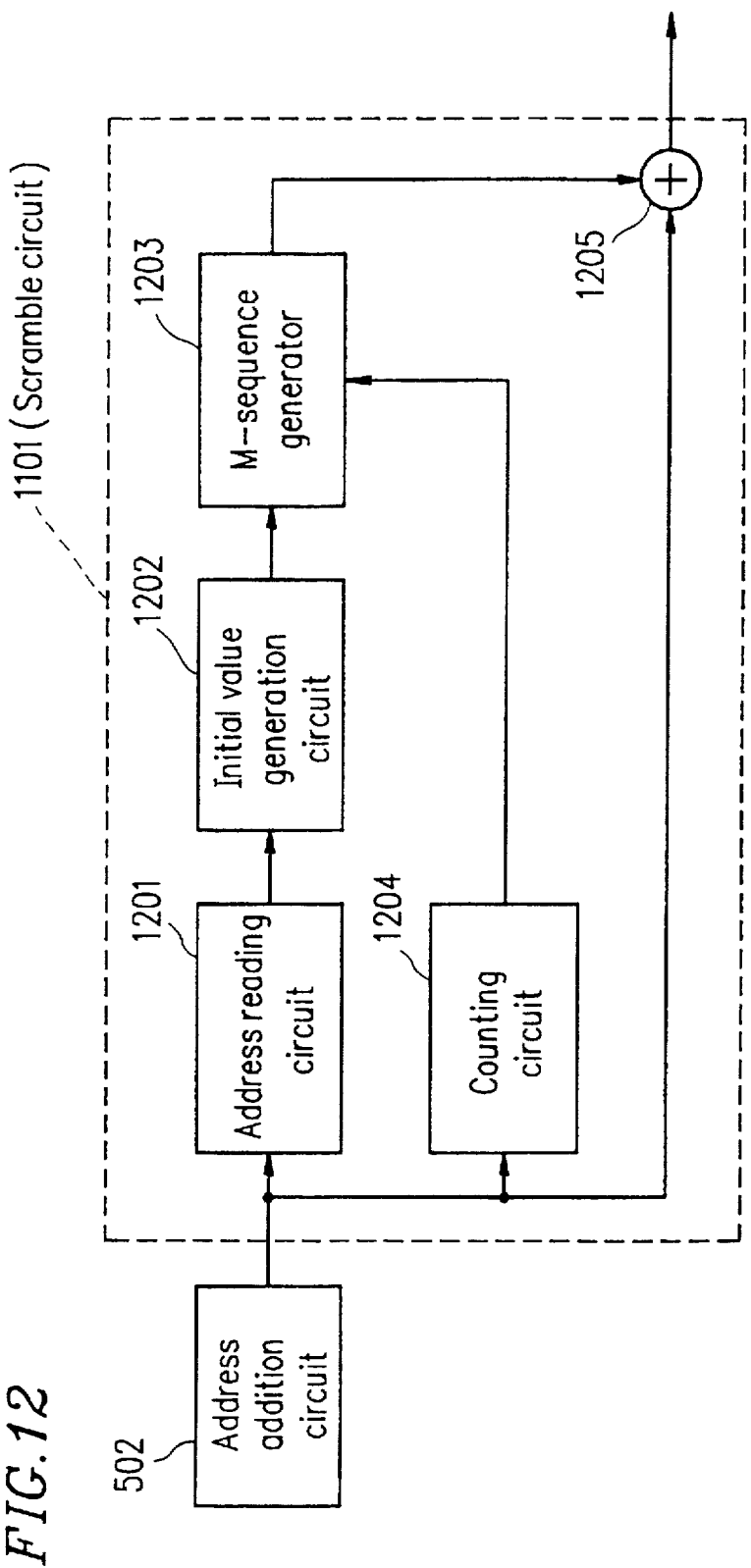
FIG. 12 is a block diagram of a scramble circuit shown in FIG. 11.

With reference to FIG. 12, the scramble circuit 1101 will be described. FIG. 12 is a block diagram of the scramble circuit 1101.

The scramble circuit 1101 includes an address reading circuit 1201, an initial value generation circuit 1202, an M-sequence generator 1203, a counting circuit 1204, and an exclusive-OR circuit 1205.

The address reading circuit 1201 receives the data sent from the address addition circuit 502, and reads a sector address number from the data. The address number is sent to the initial value generation circuit 1202. The initial value generation circuit 1202 generates an initial value in accordance with the received address number and sends the initial value to the M-sequence generator 1203. The exclusive-OR circuit 1205 successively outputs a signal in accordance with an exclusive-OR between a signal from the address addition circuit 502 and a signal from the M-sequence generator 1203.

The counting circuit 1204 counts the quantity of the data sent from the address addition circuit 502. When a first 32B of the data from the leading end of the sector is completely sent, the counting circuit 1204 generates a scramble starting signal and sends the signal to the M-sequence generator 1203. The M-sequence generator 1203 outputs zero until receiving the scramble starting signal. Accordingly, the data which is sent from the address addition circuit 502 before the counting circuit 1204 generates a scramble starting signal is sent out from the exclusive-OR circuit 1205 without being scrambled. Once the counting circuit 1204 generates a scramble starting signal, the M-sequence generator 1203, in response, generates a randomizing signal in correspondence with the initial value which is sent from the initial value generation circuit 1202. Accordingly, the exclusive-OR circuit 1205 outputs the signal from the address addition circuit 502 in the state of being scrambled.

For reading the information from the optical information carrier, the address is read after performing modulation and error correction, and then the information is descrambled based on the address to obtain the original information. Such an operation will be described with reference to FIG. 13.

Figure 13:
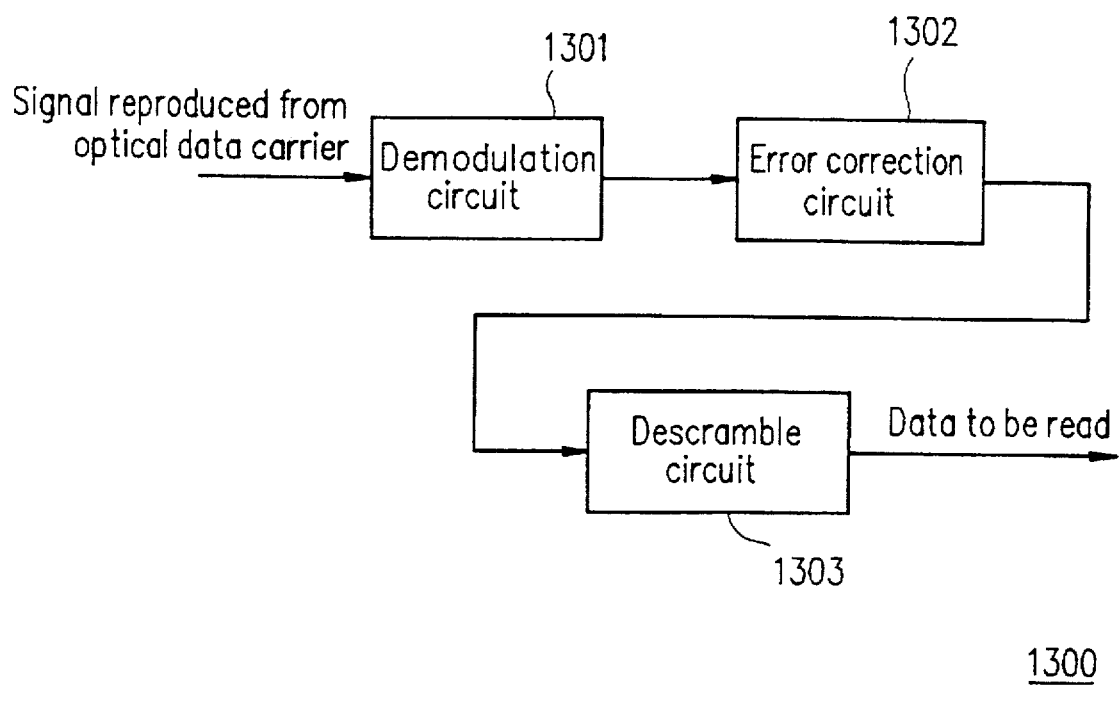
FIG. 13 is a block diagram of an optical information reproducing apparatus for reproducing the data recorded in the optical information carrier in the second example according to the present invention.

FIG. 13 is a partial block diagram of an optical data reproducing apparatus 1300 in the second example according to the present invention.

The optical data reproducing apparatus 1300 includes a demodulation circuit 1301, an error correction circuit 1302 and a descramble circuit 1303.

The demodulation circuit 1301 demodulates a signal reproduced from the optical information carrier 101 using an optical head, and sends the demodulated signal to the error correction circuit 1302. The error correction circuit 1302 corrects an error of the demodulated signal, and sends the resultant corrected data to the descramble circuit 1303. The descramble circuit 1303 reads an address from the received corrected data and descrambles the data except for the 32B data stored in the sector address region and the subcode region and sends out the resultant data to be read.

Figure 14:
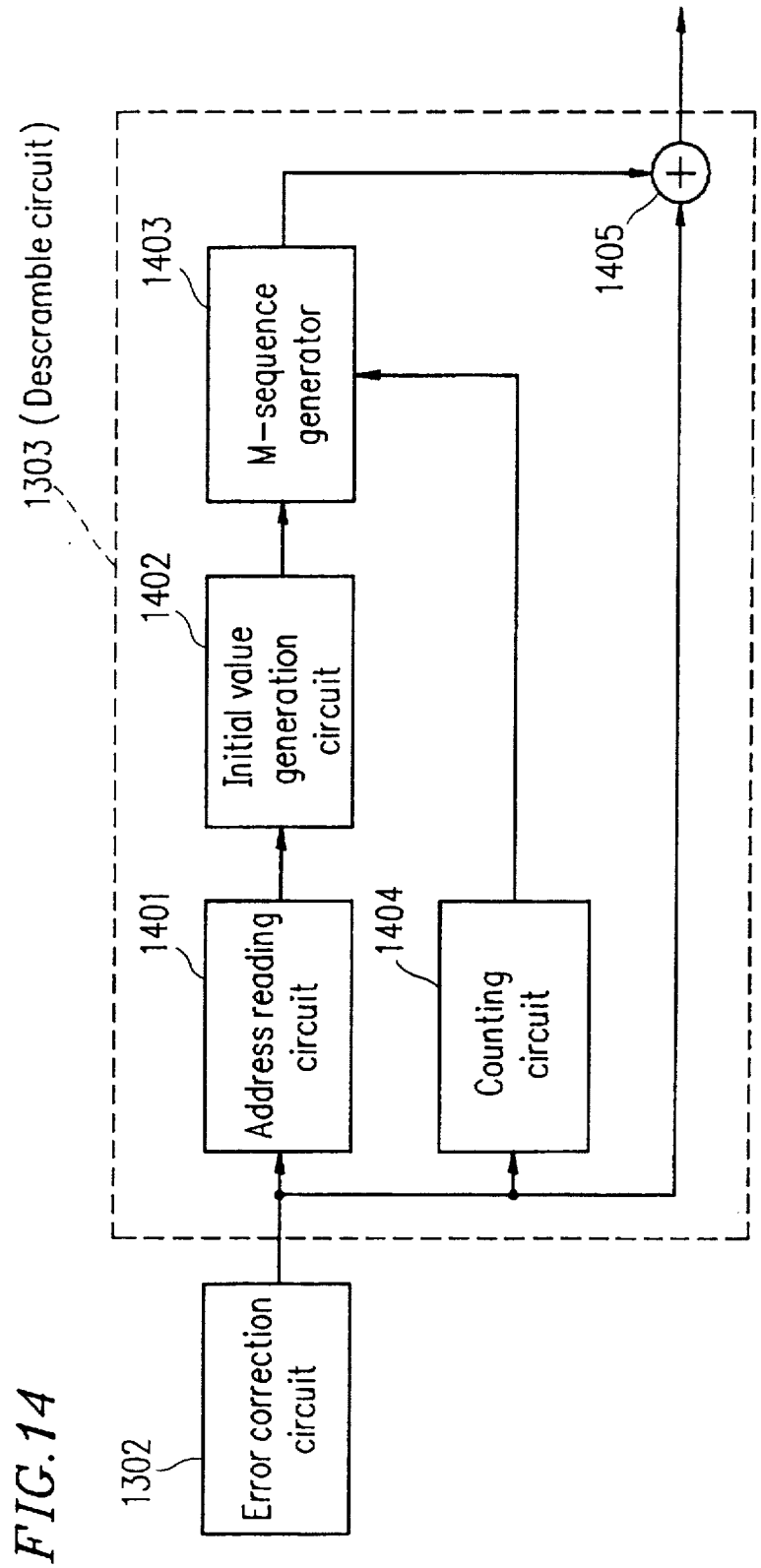
FIG. 14 is a block diagram of a descramble circuit shown in FIG. 13.

With reference to FIG. 14, the descramble circuit 1303 will be described in detail. FIG. 14 is a block diagram of the descramble circuit 1303.

The descramble circuit 1303, which has substantially the same structure as that of the scramble circuit 1101 shown in FIG. 12, includes an address reading circuit 1401, an initial value generation circuit 1402, an M-sequence generator 1403, a counting circuit 1404, and an exclusive-OR circuit 1405.

The address reading circuit 1401 receives the signal sent from the error correction circuit 1302 and reads a sector address number therefrom. The address number is sent to the initial value generation circuit 1402. The initial value generation circuit 1402 generates an initial value in accordance with the received address number and sends the initial value to the M-sequence generator 1403.

The counting circuit 1404 counts the quantity of the data sent from the error correction circuit 1302. When a first 32B of the data from the leading end of the sector is completely sent, the counting circuit 1404 generates a descramble starting signal and sends the signal to the M-sequence generator 1403. The M-sequence generator 1403 outputs zero until receiving the descramble starting signal. Accordingly, the data which is sent from the error correction circuit 1302 before the counting circuit 1404 generates a descramble starting signal is sent out from the exclusive-OR circuit 1405 without being descrambled. Once the counting circuit 1404 generates a descramble starting signal, the M-sequence generator 1403, in response, generates a randomizing signal in correspondence with the initial value which is sent from the initial value generation circuit 1402. Accordingly, the exclusive-OR circuit 1405 outputs the signal from the error correction circuit 1302 in the state of being descrambled.

In the second example, an address is read after error correction is performed as is described above. Although reading of the address takes a slightly longer time than in the first example, an error which is caused by dropout or the like is corrected. Accordingly, reliability in reading the address is improved, thus to perform descrambling with certainty. In such a system, it is necessary to store data for one sector in the memory before error correction and descrambling. This requires a memory having a capacity corresponding to the data for one sector. In the first example, such a memory is not needed.

For recording information, the information is first scrambled and then converted into an ECC. Due to such a system, the data in the parity region 50 in FIG. 3 is not scrambled. Since the parity region 50 is added to the data which has already been scrambled and thus randomized, the data in the parity region 50 also results in being randomized. Therefore, the cycle of the M-sequence generated form the M-sequence generator can be shortened, and thus the structure of the M-sequence generator can be simplified.

In the first and the second examples, the information is recorded by a CLV system, by which the optical information carrier is rotated at a constant circumferential velocity while recording information thereon. The present invention is not limited to such a system.

For example, a CAV (constant angular velocity) system or a ZCAV (zoned CAV) system is also usable. By the CAV system, the information is recorded by rotating the optical information carrier at a constant angular velocity. By the ZCAV system, the optical information carrier is divided into a plurality of zones, and the information is recorded so that the linear density of the information in the innermost track will be substantially equal among the plurality of zones.

In the case when the CAV system or the ZCAV system is used, an address number includes a track number and a sector number. The track number is serially provided to each of the tracks of the optical information carrier, taking one round thereof as one track. In other words, the track number is serially provided in the radius direction of the optical information carrier. The sector number is serially provided to each of the sectors included in the respective tracks in the circumferential direction thereof. Since the sectors are arranged side by side in the radius direction, portions of the tracks which are adjacent to each other bear the same sector number. In such a structure, the initial value is determined based on the track number, and a randomizing signal for scrambling is generated based on such an initial value. In this manner, the correlation between the signals in the adjacent tracks can be alleviated. Alternatively, the initial value is determined for scrambling based on the least significant bit of the track number and the sector number.

The capacity of information for one sector is not limited to 2400B. The capacity of information for one frame is not limited to 40B. The frame address may be omitted.

The M-sequence generator does not need to have an 18-stage shift register. An M-sequence generator having a larger-number-stage shift register outputs a signal having a longer cycle, and an M-sequence generator having a smaller-number-stage shift register outputs a signal having a shorter cycle. The number of the stages can be arbitrarily selected in accordance with the format, the information density or the like.

The initial value does not need to change every eight sectors. For example, the initial value may be change every sector or every 16 sectors. Specifically, the same effects can be obtained as long as the number of sectors by which the initial value changes is smaller than the number of sectors included in the innermost track. By changing the initial value, the correlation between the information data stored in adjacent tracks is alleviated even if the same data is recorded over several tracks. In the case where the initial value changes by $2^n$ sectors (n is a positive integer), the structure of the initial value generation circuit can be simplified.

The M-sequence generator may be replaced with any other circuit as long as a randomizing signal which is related with the initial value in a prescribed manner is generated.

The error correction signal may be a product code or a CIRC (cross interleave Reed-Solomon code) used in a compact disc. The signal for determining the initial value may be any signal which identifies the position, for example, a time code identifying the time.

As has been described so far, according to the present invention, information is scrambled based on an initial value in accordance with the value of the identification information identifying the position of each sector, and recorded in a plurality of sectors included in a track formed spirally or concentrically on a surface of a disc-shaped substrate. The scrambled and thus randomized data is recorded on the optical information carrier. Since adjacent tracks store different data, the correlation between such different data is alleviated. Accordingly, the crosstalk is randomized, as a result of which, the influence of the crosstalk on the tracking control is reduced. Thus, stable tracking control is guaranteed even if the tracking pitch is reduced.

As the identification information used for scrambling, the sector number provided to each of the plurality of sectors can be used, for example. The sector number which is inevitably needed for recording data, is easily used as the identification information. By using the sector number as the identification information, provision of an additional circuit for generating the identification information can be eliminated.

When the initial value used for scrambling changes by a prescribed number of sectors which are located successively in the circumferential direction of the optical information carrier, the randomized data obtained as a result of scrambling is recorded even if the same data is recorded over several tracks.

In the case when the initial value changes by $2^n$ sectors (n is a positive integer), the structure of the initial value generating circuit can be simplified.

In the case when the number of sectors by which the initial value changes is smaller than the number of sectors included in the innermost track, the data to be recorded is randomized with certainty even if the same information is recorded successively in an innermost area of the optical information carrier.

For recording the information, the information is divided into a plurality of units corresponding to the plurality of sectors. Each unit of the information is scrambled based on the initial value obtained in accordance with the corresponding identification information. Then, the set of the identification information and the scrambled information is converted into an error-correctable code word in which an error can be corrected. In such a case, the information is recorded into each of the plurality of sectors in the form of a code word. In this method, the address is read after error correction. Although reading of the address takes slightly longer time, an error which is caused by dropout or the like is corrected. Accordingly, reliability in reading the address is improved, thus to perform descrambling with certainty.

In an alternative method for recording the information, the information is divided into a plurality of units corresponding to the plurality of sectors. Then, the set of the identification information and each unit of the information is converted into an error-correctable code word in which an error can be corrected. The resultant code word is scrambled, except for the identification information, based on the initial value obtained in accordance with the value of the identification information. The information which is recorded in this manner can be retrieved at a high speed since the address can be read by simply performing demodulation. A large-capacity memory is not needed for reading the address.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording medium, comprising:
   a disc-shaped substrate; and
   at least one track formed in a surface of the substrate in one of a spiral form and a concentric form,
   wherein the track includes a plurality of sectors arranged successively, and each of the plurality of sectors stores address information and user data which are distinct from the address information, the user data being obtained as a result of scrambling which is performed through conversion of a value of a binary user data value based on an initial value obtained in accordance with a value of identification information for identifying a position of the sector, the order of the scrambled information being the same as the order of the binary user data, and the address information is not affected by the scrambling.

2. An optical information recording method for recording information on at least one track formed in a surface of a disc-shaped substrate in one of a spiral form and a concentric form, the track including a plurality of sectors arranged successively, each of the plurality of sectors stores address information and user data which are distinct from the address information, the method comprising the steps of:
   scrambling the information through conversion of a binary user data value based on an initial value obtained in accordance with a value of identification information for identifying a position of each of the plurality of sectors, such that the order of the scrambled information is the same as the order of the binary data, and the address information is not affected by the scrambling; and
   recording the information obtained as a result of scrambling on the respective sectors.

3. An optical information medium, comprising:
   a disc-shaped substrate; and
   at least one track formed in a surface of the substrate in one of a spiral form and a concentric form, wherein the track includes a plurality of sectors arranged, successively, and each of the plurality of sectors includes a plurality of information regions, one of the information regions including a sector address region containing address information and a data region containing user data that are distinct from the address information, the remaining respective information regions including only the data region containing at least one of the user data and parity data, the user data contained in the data regions being sequentially stored information obtained as a result of scrambling which is performed through conversion of a value of a binary data indicating the user data based on an initial value obtained in accordance with a value of identification information for identifying a position of the sector.

4. An optical information medium according to claim 3, wherein the initial value changes by a prescribed number of sectors located successively in a circumferential direction of the optical information medium.

5. An optical information medium according to claim 4, wherein the initial value changes by $2^n$ sectors where n is a positive integer.

6. An optical information medium according to claim 4, wherein the initial value changes by a number of sectors which is smaller than a number of sectors included in an innermost track.

7. An optical information medium according to claim 3, wherein the track is formed in the spiral form, and the plurality of sectors included in the track is serially provided with sector numbers for identifying the positions of the sectors, the sector numbers being used as the identification information.

8. An optical information medium according to claim 7, wherein the initial value changes by a prescribed number of sectors located successively in a circumferential direction of the optical information medium.

9. An optical information medium according to claim 8, wherein the initial value changes by $2^n$ sectors where n is a positive integer.

10. An optical information medium according to claim 8, wherein the initial value changes by a number of sectors which is smaller than a number of sectors included in an innermost track.

11. An optical information recording medium according to claim 3, wherein the conversion uses a scrambling data sequence.

12. An optical information medium according to claim 3, wherein the parity data are stored without being scrambled.

13. An optical information recording method for recording information on at least one track formed in a surface of a substrate in one of a spiral form and a concentric form, the track including a plurality of sectors arranged successively, each of the sectors including a plurality of information regions, one of the information regions including a sector address region having address information and a data region having user data distinct from the address information, the remaining respective information regions including only the data region, the method comprising the steps of:

scrambling the information through conversion of a binary data value indicating a user data based on an initial value obtained in accordance with a value of identification information for identifying a position of each of the plurality of sectors; and sequentially recording the information obtained as a result of scrambling on the respective data regions.

14. An optical information recording method according to claim 13, wherein the initial value is changed by a prescribed number of sectors located successively in a circumferential direction of the substrate.

15. An optical information recording method according to claim 14, wherein the initial value is changed by $2^n$ sectors where n is a positive integer.

16. An optical information recording method according to claim 14, wherein the initial value is changed by a number of sectors which is smaller than a number of sectors included in an innermost track.

17. An optical information recording method according to claim 13, wherein the step of scrambling the information includes the steps of:

dividing the information into a plurality of units corresponding to the plurality of sectors;

scrambling each of the plurality of units of the information based on the initial value obtained in accordance with the value of the identification information; and converting the identification information and the scrambled information into an error-correctable code word, wherein the step of recording the information includes the step of recording the code word in the respective sectors.

18. An optical information recording method according to claim 13, wherein the step of scrambling the information includes the steps of:

dividing the information into a plurality of units corresponding to the plurality of sectors;

converting the identification information and each of the plurality of units of the information into an error-correctable code word; and scrambling the code word based on the initial value obtained in accordance with the value of the identification information, wherein the step of recording the information includes the step of recording the scrambled code word in the respective sectors.

19. An optical information recording method according to claim 13, wherein the track is formed in the spiral form, the plurality of sectors included in the track is serially provided with sector numbers for identifying the positions of the sectors, and the information is scrambled using a shift register which uses a value corresponding to each of the sector numbers as the initial value.

20. An optical information recording method according to claim 19, wherein the initial value changes by a prescribed number of sectors located successively in a circumferential direction of the substrate.

21. An optical information recording method according to claim 20, wherein the initial value changes by $2^n$ sectors where n is a positive integer.

22. An optical information recording method according to claim 20, wherein the initial value changes by a number of sectors which is smaller than a number of sectors included in an innermost track.

23. An optical information recording method according to claim 19, wherein the step of scrambling the information includes the steps of:

dividing the information into the plurality of units corresponding to the plurality of sectors;

scrambling each of the plurality of units of the information based on the initial value obtained in accordance with the value of the identification information; and converting the identification information and the scrambled information into an error-correctable code word, wherein the step of recording the information includes the step of recording the code word in the respective sectors.

24. An optical information recording method according to claim 19, wherein the step of scrambling the information includes the steps of:

dividing the information into the plurality of units corresponding to the plurality of sectors;

converting the identification information and each of the plurality of units of the information into an error-correctable code word; and scrambling the code word based on the initial value obtained in accordance with the value of the identification information, wherein the step of recording the information includes the step of recording the scrambled code word in the respective sectors.

25. An optical information recording method according to claim 13, wherein the conversion uses a scrambling data sequence.

* * * * *